W. KEENAN.
Felting-Machine.
No. 223,357.   Patented Jan. 6, 1880.
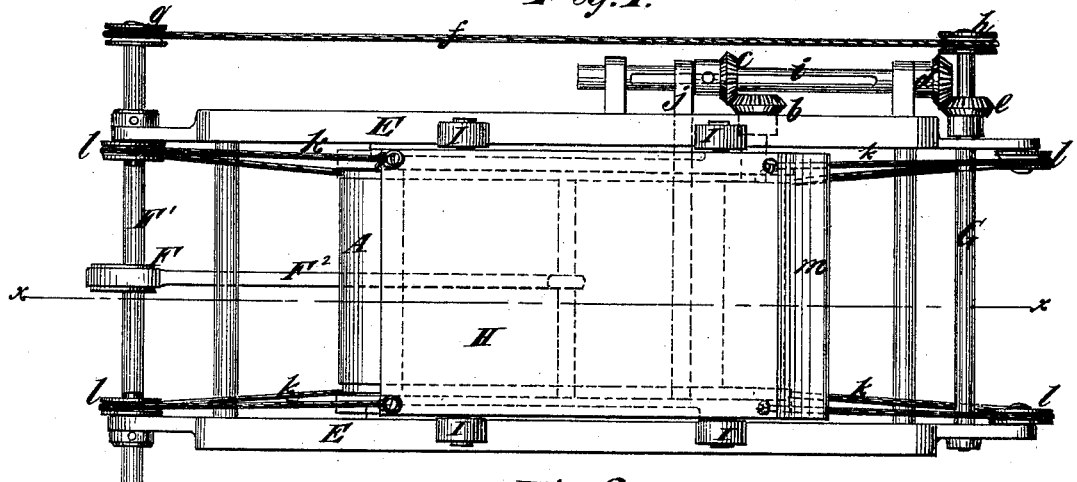
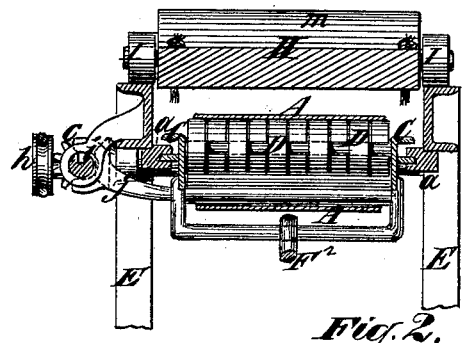
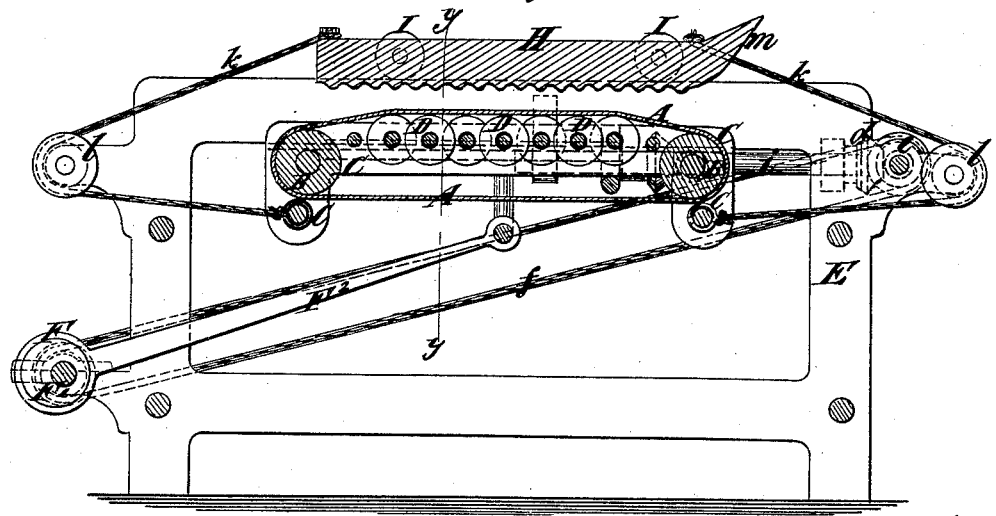
Witnesses
John Becker
Fredk Hayne
Inventor
William Keenan
by his Attorneys
Brown & Brown

UNITED STATES PATENT OFFICE.

WILLIAM KEENAN, OF BROOKLYN, NEW YORK, ASSIGNOR OF ONE-HALF OF HIS RIGHT TO NICHOLAS B. HOOPER, OF SAME PLACE.

FELTING-MACHINE.

SPECIFICATION forming part of Letters Patent No. 223,357, dated January 6, 1880.

Application filed July 8, 1879.

*To all whom it may concern:*

Be it known that I, WILLIAM KEENAN, of the city of Brooklyn, in Kings county and State of New York, have invented certain new and useful Improvements in Felting-Machines, of which the following is a specification.

My improvements relate to machines especially adapted for felting, "sizing," or "planking" the bodies of hats.

My invention consists, principally, in the combination, in such a machine, with a reciprocating bed or bottom rubber having an endless felting-apron upon it arranged to run continuously in one direction, the said rubber having at the same time a reciprocating motion imparted to it, of a top rubber or board so connected with the aforesaid bottom rubber that it will derive motion therefrom and be simultaneously reciprocated in a reverse direction at the same speed as the said bottom rubber.

The machine also comprises means for reciprocating the felting-rubber and imparting to the felting-apron a continuous movement in one direction, and also means for reciprocating the felting table or board.

In the accompanying drawings, Figure 1 represents a plan view of a felting-machine embodying my improvements. Fig. 2 represents a longitudinal section thereof on the dotted line $x\ x$, Fig. 1; and Fig. 3 represents a transverse section of a portion thereof on the line $y\ y$, Fig. 2.

Similar letters of reference designate corresponding parts in all the figures.

The bottom rubber consists of a felting-apron, A, which is preferably of some elastic material—such, for instance, as india-rubber—and which passes over rollers B, supported at each end in a suitable frame-work, C. To form an effective rubbing-surface this felting-apron is supported by rollers D, also arranged in the frame-work C, and which form, together with the felting-apron, a parallel rubbing-surface, unyielding except so far as is due to the elasticity of the felting-apron A. This bottom rubber is supported in guides $a$, (see Fig. 3,) secured to the main frame-work E, in such manner that it is held against vertical movement, while it has a rapid reciprocating motion imparted to it. The means for imparting such reciprocating motion is here represented as consisting of an eccentric, F, or its equivalent, mounted on the driving-shaft F′, and imparting motion to said felting rubber or device through an eccentric-rod, F².

The felting-apron A, in addition to the bodily-reciprocating motion which is imparted to it, also has a continuous movement or travel in one direction, and the means here represented for imparting such continuous movement consists in a bevel-wheel, $b$, carried by the reciprocating bottom rubber, and receiving motion through the bevel-wheels $c$, $d$, and $e$ from the shaft G, which has a rotary motion imparted to it from the shaft F′ by means of a belt, $f$, and pulleys $g\ h$.

In order to accommodate itself to the motion of the reciprocating bottom rubber the bevel-wheel $c$, while it is held securely upon the shaft $i$ so as to turn therewith, has a reciprocating movement upon said shaft corresponding to the movement of the bottom rubber, and said gear-wheel is held in engagement with the gear-wheel $b$ by an arm, $j$, extending from the side of the felting rubber or device.

Arranged parallel with, and in this instance above, the felting-apron A is a top rubber or board, H, preferably having a corrugated under surface, and here represented as supported by rollers I upon the top of the frame-work E of the machine. By this arrangement I am enabled to dispense with any springs or equivalent devices for causing the said top rubber or board to exert a pressure, as its own weight suffices.

The table or board H is so connected with the reciprocating bottom rubber that it moves always at the same speed and in a reverse direction to the former. The means here shown for connecting them consists of flexible connections, shown as consisting of cords $k$ passing over stationary pulleys $l$, and connected at one end to the bottom rubber and at the other end to the top rubber or board, H. The flexible connections $k$ should be provided with some means for adjusting their length—such as a screw-thread or other device—whereby the pressure exerted by the top rubber or board, H, might be regulated.

In order to facilitate the placing of hats in the machine the board or table H is made upwardly flaring at one end, as represented at m. The hat-bodies in the form of rolls are placed between the bottom or bed rubber and the top rubber or board one after another, and are gradually carried forward between them by the continuous progressive movement of the felting-apron, while at the same time they are subjected to a severe rubbing by the reverse movements of the felting top rubber table or board and the bottom rubber or device.

This machine may, it is found, be used with advantage as a second sizing-machine after the hat bodies have been partially sized in a preparatory machine, and when a stronger and more uniform pressure is desired than can be produced by the first machine.

As the top rubber or board is operated from the bottom rubber or device, I am enabled to operate both by one eccentric; hence the construction of the machine is much simplified and its cost decreased.

What I claim as my invention, and desire to secure by Letters Patent, is—

1. In a felting-machine, the combination, with a reciprocating felting-bed or bottom rubber having upon it an endless felting-apron, to which a continuous progressive motion is imparted, of a top rubber or board connected with the aforesaid bottom rubber and deriving therefrom a reciprocating motion, which is always at the same speed, but in a direction the reverse of that of the said bottom rubber, substantially as specified.

2. In a felting-machine, the combination, with a reciprocating bottom rubber having upon it an endless felting-apron, A, to which a continuous progressive motion is imparted, of a top rubber or board, H, flexible connections k, and pulleys l, substantially as specified.

3. In a felting-machine, the combination, with a reciprocating bottom rubber having upon it an endless felting-apron, A, to which a continuous progressive motion is imparted, of a top rubber or board, H, arranged above the latter, provided with rollers I, and connected with said bottom rubber by means of flexible connections k, passing over pulleys l, substantially as specified.

WILLIAM KEENAN.

Witnesses:
T. J. KEANE,
FREDK. HAYNES.